(12) United States Patent
Iwatsuki (10) Patent No.: US 12,467,864 B2
(45) Date of Patent: Nov. 11, 2025

(54) BATTERY MODULE

(71) Applicant: SANYO Electric Co., Ltd., Osaka (JP)

(72) Inventor: Nobuo Iwatsuki, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 570 days.

(21) Appl. No.: 17/906,356

(22) PCT Filed: Dec. 28, 2020

(86) PCT No.: PCT/JP2020/049218
§ 371 (c)(1),
(2) Date: Sep. 15, 2022

(87) PCT Pub. No.: WO2021/199548
PCT Pub. Date: Oct. 7, 2021

(65) Prior Publication Data
US 2023/0136015 A1    May 4, 2023

(30) Foreign Application Priority Data
Mar. 31, 2020  (JP) ................. 2020-064241

(51) Int. Cl.
| | | |
|---|---|---|
| *G01N 21/59* | (2006.01) | |
| *H01M 10/42* | (2006.01) | |
| *H01M 10/48* | (2006.01) | |
| *H01M 50/342* | (2021.01) | |
| *H01M 50/512* | (2021.01) | |

(52) U.S. Cl.
CPC ........ *G01N 21/59* (2013.01); *H01M 10/4228* (2013.01); *H01M 10/48* (2013.01); *H01M 50/3425* (2021.01); *H01M 50/512* (2021.01)

(58) Field of Classification Search
CPC .............. G01N 21/59; H01M 50/3425; H01M 50/512; H01M 10/4228; H01M 10/48
See application file for complete search history.

(56) References Cited

U.S. PATENT DOCUMENTS

| | | | |
|---|---|---|---|
| 11,489,213 B2 | 11/2022 | Egashira et al. | |
| 2011/0027630 A1* | 2/2011 | Tsutsumi .......... | H01M 10/0459 429/153 |

(Continued)

FOREIGN PATENT DOCUMENTS

| | | | |
|---|---|---|---|
| CN | 109119571 | * | 1/2019 |
| JP | H08-149077 A | | 6/1996 |

(Continued)

OTHER PUBLICATIONS

JP2016054127MT (Year: 2016).*

(Continued)

*Primary Examiner* — Alexander Usyatinsky
(74) *Attorney, Agent, or Firm* — WHDA, LLP (57) ABSTRACT

Battery module includes: a battery stack in which a plurality of batteries provided with a valve that ejects gas are stacked in a first direction; a discharge path that discharges gas ejected from the valve in a second direction intersecting the first direction; light emitter that is provided on one end in the first direction of the battery stack and emits light to the discharge path; and light receiver that is provided on another end in the first direction of the battery stack and receives the light emitted from light emitter.

10 Claims, 7 Drawing Sheets

(56) References Cited

U.S. PATENT DOCUMENTS

2017/0190598 A1* 7/2017 Liao .................. C02F 1/004
2019/0372065 A1 12/2019 Kawata et al.
2021/0226268 A1 7/2021 Egashira et al.

FOREIGN PATENT DOCUMENTS

| JP | 2016054127 | * | 4/2016 |
| JP | 2019-212395 A | | 12/2019 |
| KR | 2010-0019684 A | | 2/2010 |
| WO | 2013/161655 | | 10/2013 |
| WO | 2020/003802 A1 | | 1/2020 |

OTHER PUBLICATIONS

The decision of JPO to grant a Patent for Application JP 2022511542 (Year: 2025).*
English Translation of Chinese Search Report dated Oct. 31, 2023, issued in counterpart CN application No. 202080096202.4. (3 pages).
International Search Report of PCT application No. PCT/JP2020/049218 dated Apr. 6, 2021.
English translation of Search Report dated dated May 1, 2024, issued in counterpart CN Application No. 202080096202.4. (2 pages).

* cited by examiner

BATTERY MODULE

CROSS-REFERENCE TO RELATED APPLICATIONS

This application is a U.S. national stage application of the PCT International Application No. PCT/JP2020/049218 filed on Dec. 28, 2020, which claims the benefit of foreign priority of Japanese patent application No. 2020-064241 filed on Mar. 31, 2020, the contents all of which are incorporated herein by reference.

TECHNICAL FIELD

The present invention relates to a battery module.

BACKGROUND ART

For example, as a power source for a vehicle or the like that requires a high output voltage, there has been known a battery module formed by electrically connecting a plurality of batteries to each other. In general, each of the batteries that form the battery module is provided with a valve that opens in response to an increase in internal pressure. When a gas is generated in a battery due to a chemical reaction so that an internal pressure in the battery is increased, a gas having a high temperature and a high pressure is blown off from a valve. With respect to a battery module including such batteries, PTL 1 discloses a battery module which includes: a battery stack in which a plurality of batteries are stacked; and an exhaust duct which is fixed to one surface of the battery stack in such a manner that the exhaust duct is connected to the valves of the respective batteries.

CITATION LIST

Patent Literature

PTL 1: WO 2013/161655 A

SUMMARY OF THE INVENTION

Technical Problem

For example, in a temperature sensor provided to detect a temperature of a battery in a battery module, even when gas is generated in the battery, an alarm cannot be issued unless heat is transmitted to the temperature sensor. The temperature sensor does not measure the temperature of the gas, and even if the gas is generated, the generation of the gas cannot be detected by the temperature sensor in a case where the temperature of the battery itself does not rise.

The present invention has been made in view of such circumstances, and an object of the present invention is to provide a technique for improving safety of a battery module.

A battery module according to an aspect of the present invention includes: a battery stack in which a plurality of batteries provided with a valve that ejects gas are stacked in a first direction; a discharge path that discharges gas ejected from the valve in a second direction intersecting the first direction; a light emitter that is provided on one end in the first direction of the battery stack and emits light to the discharge path; and a light receiver that is provided on another end in the first direction of the battery stack and receives the light emitted from the light emitter.

According to the present invention, the safety of a battery module can be enhanced.

DESCRIPTION OF EMBODIMENT

Hereinafter, the present invention will be described based on a preferred exemplary embodiment with reference to the drawings. The exemplary embodiment is not intended to limit the invention but is an example, and all features described in the exemplary embodiment and combinations thereof are not necessarily essential to the invention. The same or equivalent constituent elements, members, and processing illustrated in the drawings are denoted by the same reference numerals, and a redundant description will be omitted as appropriate. The scale and the shape of each part illustrated in each figure are set for the sake of convenience in order to facilitate the understanding of the description and should not be interpreted in a limited manner unless otherwise specified. In cases where terms such as "first" and "second" are used in the present description or claims, these terms do not represent any order or importance but are intended to distinguish one configuration from another configuration, unless otherwise specified. From each of the drawings, some of members not important for describing the exemplary embodiments are omitted.

Exemplary Embodiment

Figure 1:
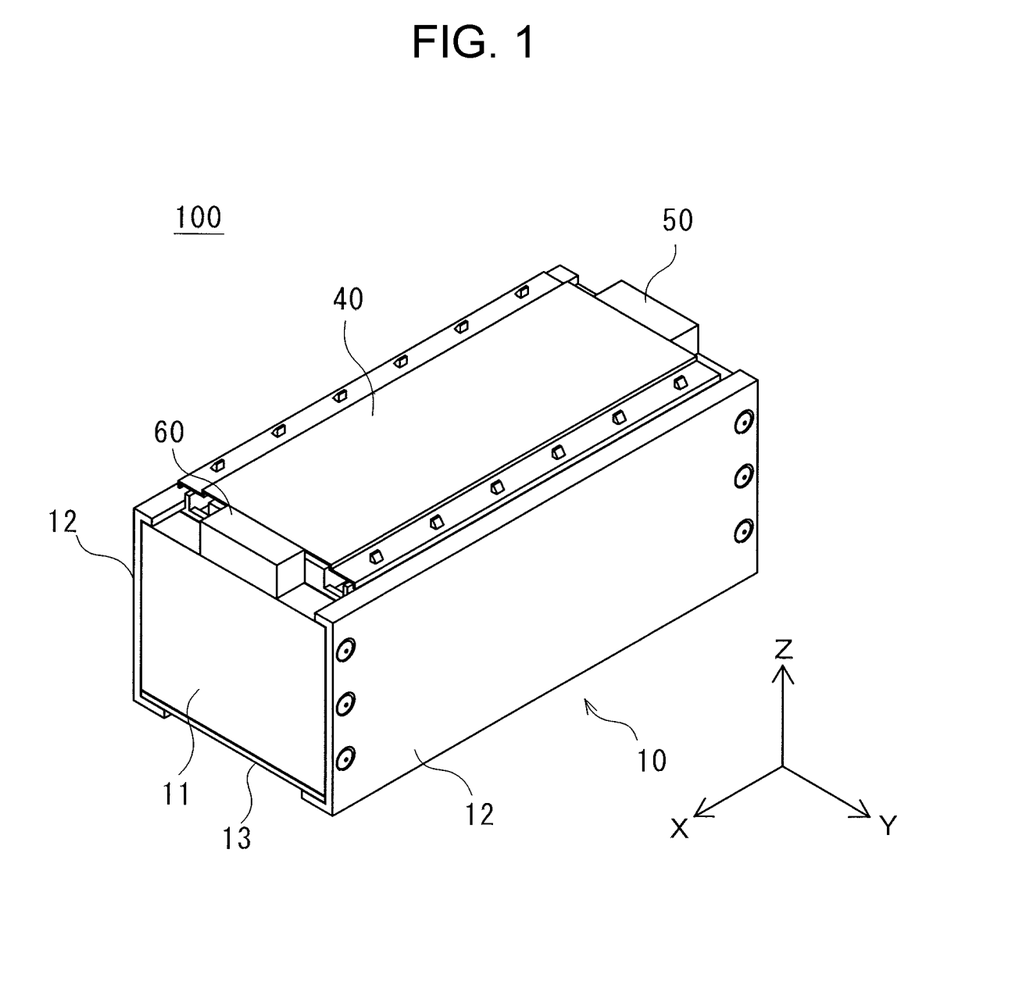
FIG. 1 is a perspective view illustrating an appearance of a battery module according to an exemplary embodiment.
Figure 2:
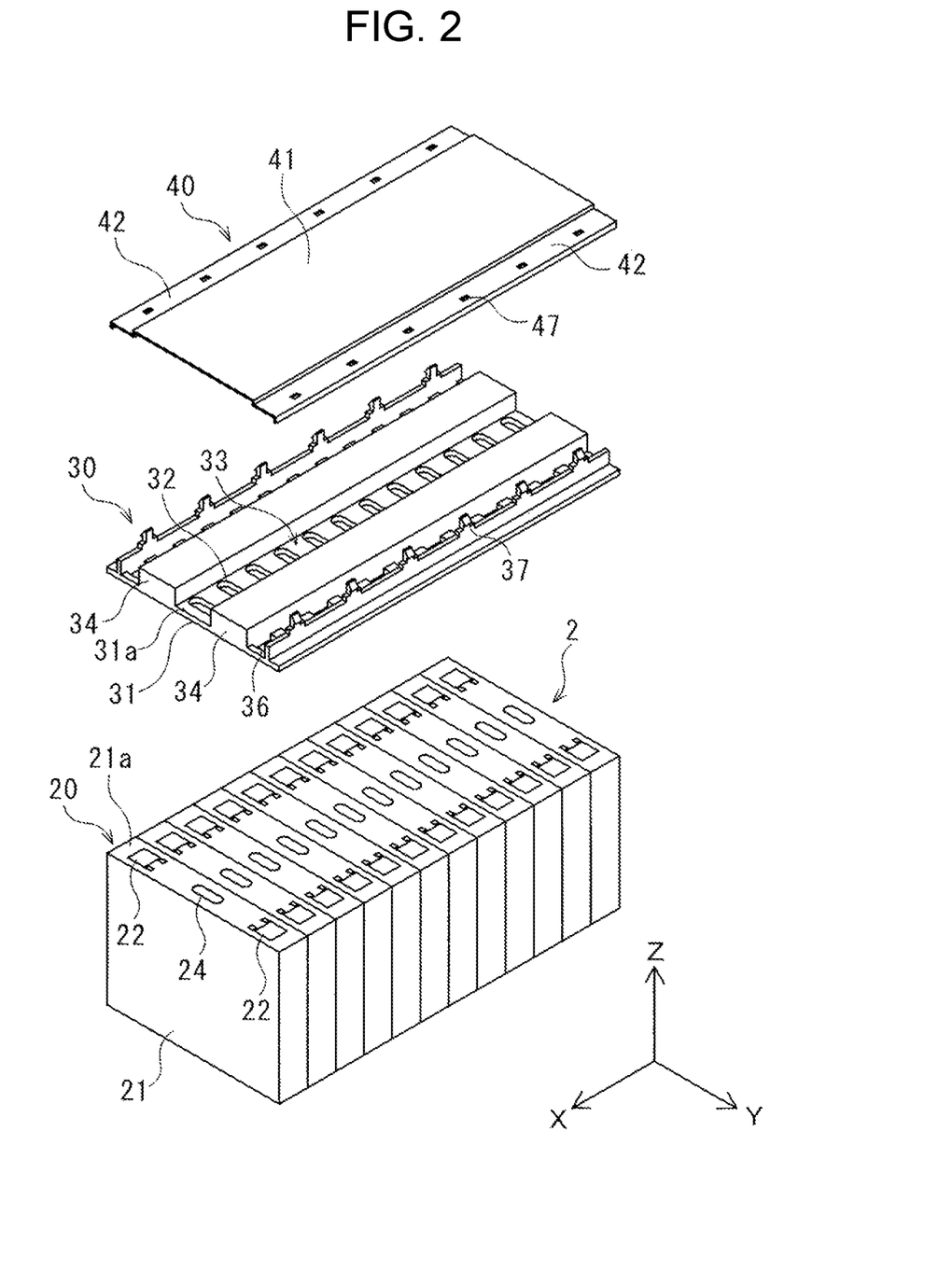
FIG. 2 is an exploded perspective view of a part of the battery module.

FIG. 1 is a perspective view illustrating an appearance of battery module 100 according to an exemplary embodiment, and FIG. 2 is an exploded perspective view of a part of battery module 100. Battery module 100 includes battery stack 2, rectangular-parallelepiped housing 10, duct plate 30, cover plate 40, light emitter 50, and light receiver 60.

Housing 10 includes end plates 11 located at both ends in a stacking direction of batteries 20 in battery stack 2, side plates 12 that sandwich end plates 11 and cover side surfaces of battery stack 2, and base plate 13 that covers a bottom of battery stack 2. Battery stack 2 is housed inside housing 10, and is covered with duct plate 30 and cover plate 40. In each drawing, a stacking direction of the batteries is defined as an X direction, a direction intersecting an X direction and corresponding to a lateral of the batteries is defined as a Y direction, and a direction intersecting the X and Y directions is defined as a Z direction. The stacking direction (X direction) of the batteries corresponds to the first direction in the claims, and the Y direction intersecting the X direction corresponds to the second direction in the claims.

Battery stack 2 is formed by stacking a plurality of batteries 20 in the X direction. A spacer formed of a resin material or the like in a sheet shape or a plate shape may be disposed between the batteries to electrically insulate the batteries from each other. Each battery 20 is a rechargeable secondary battery such as a lithium-ion battery, a nickel-metal-hydride battery, or a nickel-cadmium battery. Additionally, each battery 20 is a so-called prismatic battery, and has outer covering can 21 having a flat rectangular-parallelepiped shape. One surface of outer covering can 21 is provided with an opening having a substantially rectangular shape not illustrated, and an electrode body, an electrolyte, and the like are accommodated in outer covering can 21 through the opening. Sealing plate 21a that closes the opening of outer covering can 21 is disposed in the opening.

Output terminal 22 of a positive electrode is disposed on sealing plate 21a at a position close to one end of sealing plate 21a in a longitudinal direction, and output terminal 22 of a negative electrode is disposed on sealing plate 21a at a position close to the other end of sealing plate 21a in the longitudinal direction. The pair of output terminals 22 is electrically connected to the corresponding one of a positive electrode plate and a negative electrode plate, constituting the electrode assembly. Hereinafter, output terminal 22 of the positive electrode is referred to as positive-electrode terminal 22a, and output terminal 22 of the negative electrode is referred to as negative-electrode terminal 22b as appropriate. When there is no need to distinguish polarities of output terminals 22 from each other, positive-electrode terminal 22a and negative-electrode terminal 22b are collectively referred to as output terminals 22.

Respective output terminals 22 are inserted into through-holes (not illustrated) formed in sealing plate 21a. A seal member (not illustrated) having an insulating property is interposed between respective output terminals 22 and respective through-holes. In the following description, for convenience, sealing plate 21a is an upper surface of battery 20, and a bottom surface of outer covering can 21 facing sealing plate 21a is a lower surface of battery 20.

Battery 20 has two main surfaces that connect the upper surface and the lower surface of battery 20 to each other. The main surfaces are surfaces having the largest area out of the six surfaces of battery 20. The main surfaces are long side surfaces connected to the long sides of the upper surface and the long sides of the lower surface. Two remaining surfaces except for the upper surface, the lower surface, and the two main surfaces are referred to as the side surfaces of battery 20. These side surfaces are a pair of short side surfaces connected to the short sides of the upper surface and the short sides of the lower surface. These directions and positions are defined for the sake of convenience. Therefore, for example, the part defined as the upper surface in the present invention does not necessarily mean a part located above the part defined as the lower surface.

Valve 24 is disposed on sealing plate 21a between the pair of output terminals 22. Valve 24 is also referred to as a safety valve. Valve 24 is a mechanism for releasing a gas in each battery 20. Valve 24 is configured to release an internal gas by opening valve 24 when an internal pressure of outer covering can 21 is increased to a predetermined value or more. For example, valve 24 includes: a thin part that is formed on a part of sealing plate 21a and is thinner than other parts of valve 24; and a linear groove formed on a surface of the thin part. In this configuration, when an internal pressure of outer covering can 21 increases, valve 24 is opened by tearing the thin wall part with the groove as a tearing starting point. Valve 24 of each battery 20 is connected to discharge path 33 to be described later, and the gas inside the battery is discharged from valve 24 to discharge path 33.

The plurality of batteries 20 are stacked at predetermined intervals with the main surfaces of adjacent batteries 20 facing each other. Note that the term "stack" means that a plurality of members are arranged in any one direction. Thus, stacking batteries 20 also includes arranging the plurality of batteries 20 horizontally. In the present exemplary embodiment, batteries 20 are horizontally stacked, and the X direction, which is the stacking direction of batteries 20, is a direction extending horizontally. The Y direction is a horizontal direction perpendicular to the X direction, and the Z direction perpendicular to the X and Y directions is a vertical direction.

Figure 3A:
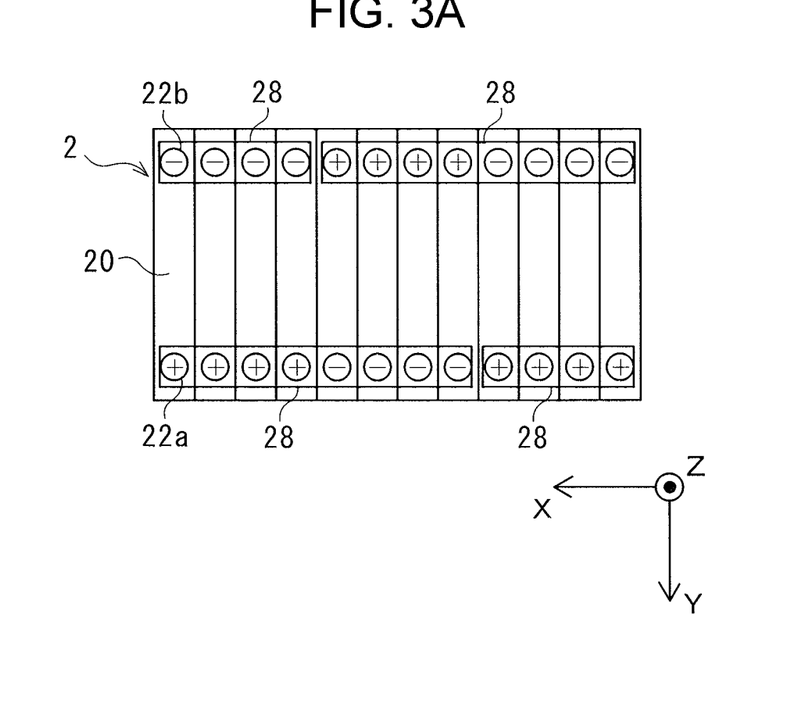
FIG. 3A is a schematic diagram illustrating a case where batteries are connected in parallel.
Figure 3B:
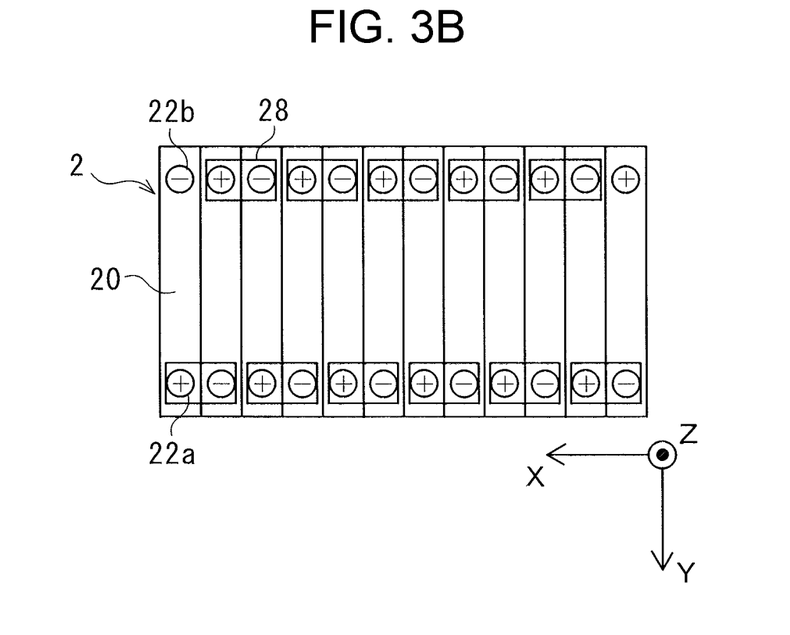
FIG. 3B is a schematic diagram illustrating a case where batteries are connected in series.

Each battery 20 is disposed such that output terminals 22 are directed in the same direction. In the present exemplary embodiment, each battery 20 is disposed such that output terminals 22 are directed upward in the vertical direction. FIG. 3A is a schematic diagram illustrating a case where batteries 20 are connected in parallel, and FIG. 3B is a schematic diagram illustrating a case where batteries 20 are connected in series. FIGS. 3A and 3B correspond to views of the upper surfaces of stacked batteries 20.

As illustrated in FIG. 3A, when batteries 20 are electrically connected in parallel, one positive-electrode terminal 22a of the adjacent batteries 20 and the positive-electrode terminal 22a of the other battery 20 are so as to be adjacent to each other, and the positive electrodes or the negative electrodes are connected by bus bar 28. In FIG. 3A, three blocks each including four batteries 20 as a part of 12 batteries 20 electrically connected in parallel are provided, and the blocks are connected in series. In the case that batteries 20 are connected in parallel, sometimes the voltage abnormality is not detected in the whole block even if the voltage abnormality is generated in one battery 20.

As illustrated in FIG. 3B, when batteries 20 are electrically connected in series, one positive-electrode terminal 22a of adjacent batteries 20 and negative-electrode terminal 22b of other battery 20 are stacked so as to be adjacent to each other, and the positive electrode and the negative electrode are connected by bus bar 28. In FIG. 3B, all 12 batteries 20 are connected in series.

Duct plate 30 is placed on an upper surface of battery stack 2. Duct plate 30 is a plate-like member made of resin that covers an upper surface of battery stack 2, that is, a surface on which valve 24 of each battery 20 is disposed, and is fixed to battery stack 2 by, for example, side plate 12.

Duct plate 30 has base plate 31 extending along the upper surface of battery stack 2, and has a plurality of openings 32 through which valve 24 is exposed at positions of base plate 31 corresponding to valve 24 of batteries 20. Duct plate 30 has discharge path 33 that temporarily stores the gas ejected from each battery 20. Discharge path 33 extends in the stacking direction X of batteries 20 and is connected to valve 24 of each battery 20. Each valve 24 communicates with discharge path 33 via opening 32.

Discharge path 33 is defined by shielding part 41 of cover plate 40 covering the upper side of the plurality of openings 32 and a pair of walls 34 surrounding the side of each opening 32. Each of shielding part 41 and the pair of walls 34 has an elongated shape elongated in the X direction. The pair of walls 34 is arranged in the Y direction with the plurality of openings 32 or the plurality of valves 24 sandwiched therebetween, and each wall surface faces the Y direction. The pair of walls 34 is formed so as to protrude from base plate 31 toward cover plate 40. Shielding part 41 constitutes a top surface of discharge path 33.

In addition, the color of each wall surface of shielding part 41 of cover plate 40, the pair of walls 34 surrounding the side of each opening 32, and base plate 31 facing discharge path 33 and defining discharge path 33 is a color such as black for suppressing reflection of light. The color of the wall surface may be the ground color of the constituent material of each component, or may be colored by plating or coating.

Duct plate 30 has openings 36 through which output terminals 22 are exposed at positions corresponding to output terminals 22 of respective batteries 20. Bus bars 28 are placed on respective openings 36. The plurality of bus bars 28 are supported by duct plate 30 Thus, duct plate 30 also functions as a so-called bus bar plate. Bus bar 28 placed on each opening 36 electrically connects output terminals 22 of adjacent batteries 20.

Cover plate 40 is a plate-like member that covers the upper side of duct plate 30, and is placed on the upper surface of duct plate 30. Cover plate 40 is made of, for example, an insulating resin. Cover plate 40 includes shielding part 41 that covers discharge path 33 and wall 34 of duct plate 30, and terminal cover 42 that further extends from shielding part 41 to both ends in the Y direction of duct plate 30 and covers output terminal 22 of battery 20.

Cover plate 40 of the present exemplary embodiment is a so-called top cover that forms a part of an outer shell of battery module 100, specifically, the upper surface of battery module 100. Cover plate 40 suppresses contact of dew condensation water, dust, and the like with output terminal 22, valve 24, bus bar 28, and the like of battery 20.

Both ends of cover plate 40 in the Y direction are fixed to duct plate 30. Duct plate 30 has a plurality of engagement claws 37 at both ends in the Y direction at intervals in the X direction. Cover plate 40 has engagement holes 47 at positions overlapping respective engagement claws 37 when viewed from the Z direction, and is fixed to duct plate 30 by inserting respective engagement claws 37 into respective engagement holes 47 and engaging with each other. In the present exemplary embodiment, cover plate 40 is fixed to duct plate 30 by so-called snap-fitting, but may be fixed to duct plate 30 using a fastener such as a screw.

Figure 4:
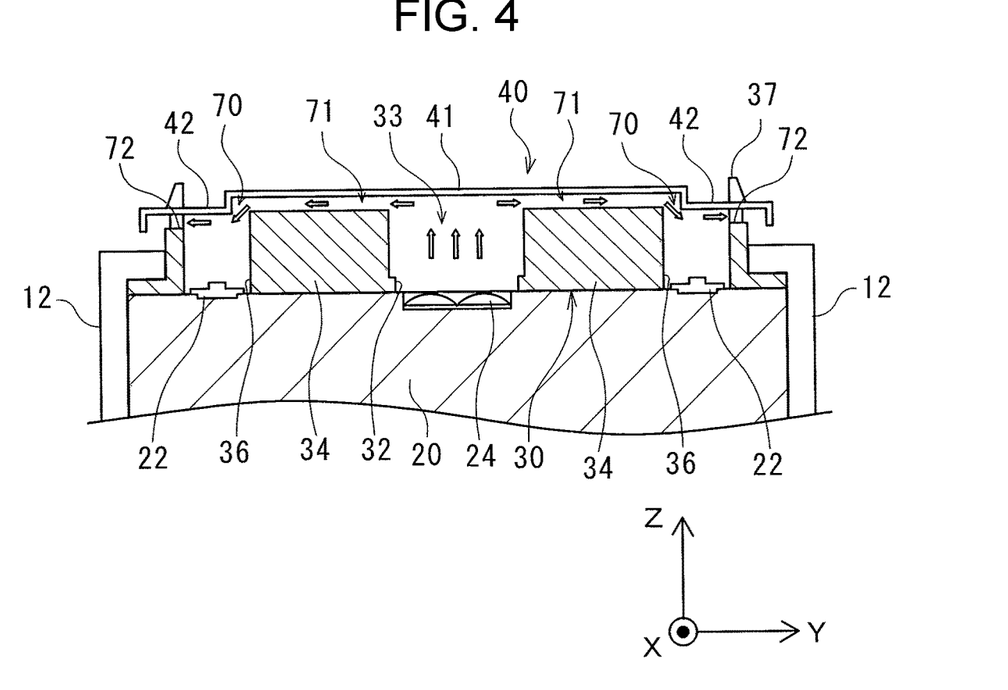
FIG. 4 is a cross-sectional side view of a region in which a duct plate and a cover plate of the battery module are disposed.

FIG. 4 is a cross-sectional side view of a region in which duct plate 30 and cover plate 40 of battery module 100 are disposed. In FIG. 4, illustration of the internal structure of battery 20 is omitted. Battery module 100 includes flow path parts 70. Flow path part 70 is a flow path for leaking the gas in discharge path 33 to the outside of battery module 100. Discharge path 33 is connected to flow path part 70 that causes the gas in discharge path 33 to leak to the outside, thereby discharging the gas in the Y direction.

Flow path part 70 is defined by duct plate 30 and cover plate 40, and extends in the Y direction (that is, the second direction in the claims) from discharge path 33. In the present exemplary embodiment, flow path part 70 is disposed on both sides in the Y direction with discharge path 33 sandwiched therebetween. Each of flow path parts 70 communicates with discharge path 33 by gap 71 between wall 34 of duct plate 30 and shielding part 41 of cover plate 40, and is connected to the outside of battery module 100 by flow path outlet 72 disposed at the end in the Y direction.

Gap 71 is formed so as to extend to batteries 20 at both ends in the X direction of battery stack 2. Flow path outlet 72 is formed as a long opening extending in the X direction corresponding to gap 71. Therefore, flow path portion 70 is a planar flow path extending in the X direction and the Y direction. Gap 71 and flow path outlet 72 may be partitioned into a plurality of gaps and openings in the X direction.

Figure 5:
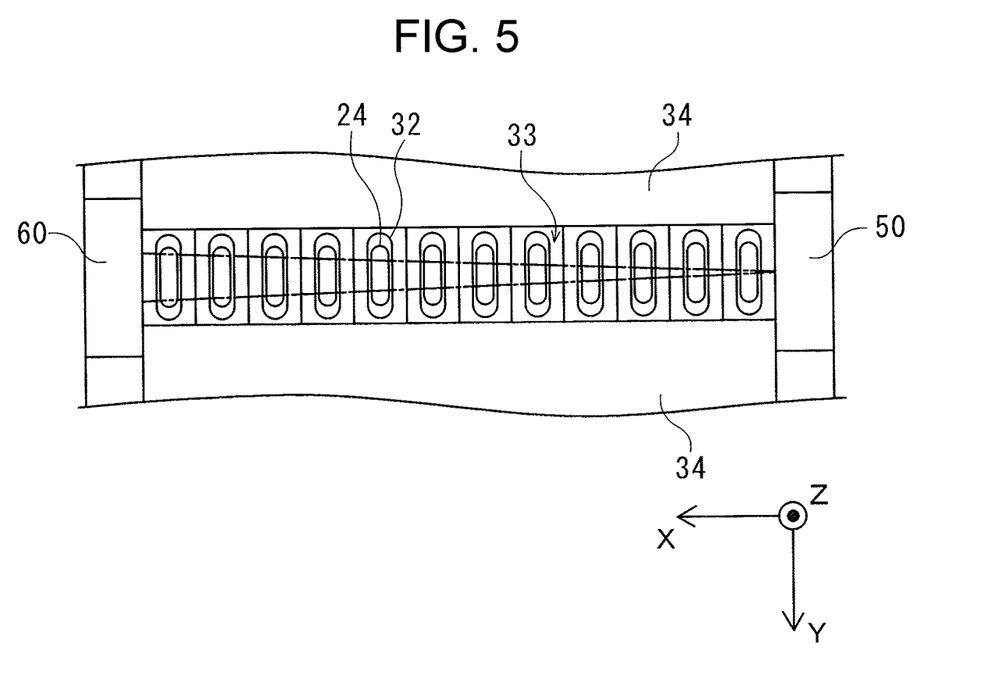
FIG. 5 is a schematic diagram for explaining an arrangement of a light emitter and a light receiver.
Figure 6A:
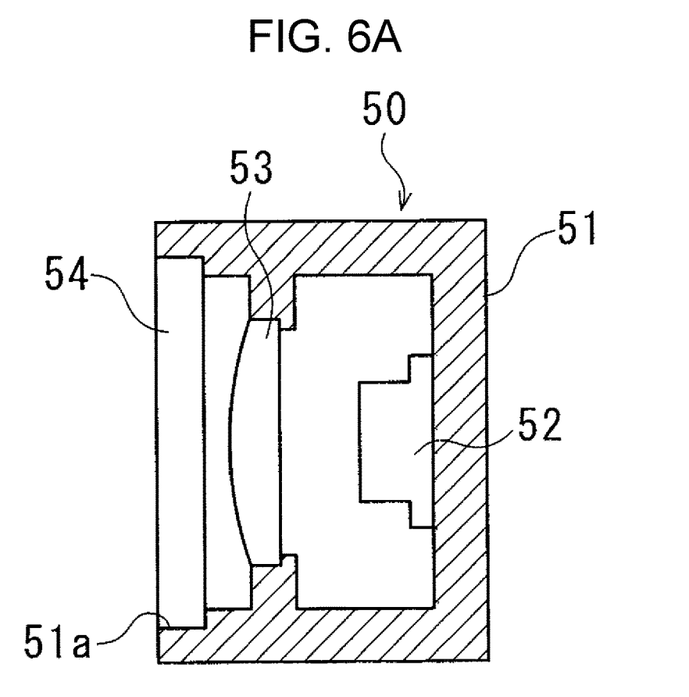
FIG. 6A is a schematic cross-sectional view illustrating a configuration of the light emitter.
Figure 6B:
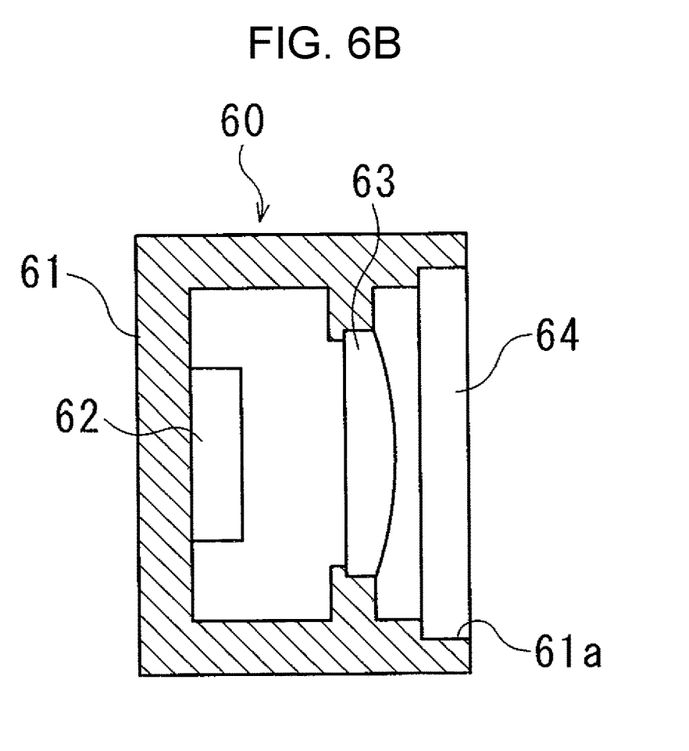
FIG. 6B is a schematic cross-sectional view illustrating a configuration of the light receiver.

FIG. 5 is a schematic diagram for explaining the arrangement of light emitter 50 and light receiver 60. FIG. 6A is a schematic cross-sectional view illustrating a configuration of light emitter 50, and FIG. 6B is a schematic cross-sectional view illustrating a configuration of light receiver 60. Light emitter 50 is provided on one end side in the X direction of discharge path 33 of battery module 100. Light receiver 60 faces light emitter 50 and is provided on the other end side in the X direction of discharge path 33.

Light emitter 50 is configured by providing light source 52, emitting lens 53, and transparent window 54 in housing 51. Housing 51 has opening 51a facing discharge path 33. Transparent window 54 is fitted in opening 51a. Transparent window 54 transmits the light flux emitted from light source 52 to discharge path 33, and prevents the gas emitted from battery 20 to discharge path 33 from flowing into housing 51.

Light source 52 is, for example, a semiconductor laser, and emits light toward discharge path 33. Emitting lens 53 can adjust the light flux emitted from light source 52 to an arbitrary light flux. That is, the light flux emitted from light source 52 is adjusted to a parallel light flux as an infinite system or a light flux having an arbitrary diffusion angle as a finite system. Note that, in the lens portion of emitting lens 53, known techniques and optical element components that have been developed in various technical fields related to collimation of emitted light can be used.

Light receiver 60 is configured by providing light receiving element 62, light receiving lens 63, and transparent window 64 in housing 61. Housing 61 has opening 61a facing discharge path 33. Transparent window 64 is fitted in opening 61a. Transparent window 64 transmits the light flux from discharge path 33 into housing 61, and prevents the gas discharged from battery 20 to discharge path 33 from flowing into housing 61.

Light receiving element 62 is, for example, a photodiode, and detects a light flux transmitted from discharge path 33 into housing 61. Light receiving lens 63 adjusts the light flux transmitted into housing 61 to an arbitrary light flux and transmits the light flux to light receiving element 62. For example, light receiving lens 63 condenses the light flux transmitted into housing 61 and transmits the light flux to light receiving element 62. Note that, for the lens portion in light receiving lens 63, known techniques and optical element components that have been developed in various technical fields related to condensing of light fluxes and the like can be used.

Next, an operation of battery module 100 will be described based on discharge and detection of gas ejected from battery 20. At least a portion of the gas blown off from battery 20 is a combustible gas. The gas blown off from battery 20 also contains fine particles such as broken pieces of a battery structure. When a combustible gas having a high temperature and fine particles having a high temperature are discharged to the outside of battery module 100, there is a possibility that a magnitude of a fire outside battery module 100 is increased. On the other hand, in the present exemplary embodiment, the gas jetted from valve 24 is once discharged to the outside of battery module 100 via discharge path 33 and flow path portion 70. Therefore, the temperature can be lowered until the gas and the fine particles are discharged to the outside of battery module 100.

The light emitted from light emitter 50 is received by light receiver 60 via discharge path 33, but when the gas is not emitted to discharge path 33, the light reception level is substantially constant. When the gas is ejected from battery 20 to discharge path 33, the light emitted from light emitter 50 hits the gas and is reduced, and the light reception level in light receiver 60 is lowered, so that the ejection of the gas can be detected. Battery module 100 outputs an alarm signal when gas ejection is detected, and measures such as limiting and stopping the output of battery module 100 are taken based on the alarm signal, whereby the safety of the battery module can be enhanced.

Light emitter 50 is provided on one end side in the X direction that is the stacking direction of battery stack 2, and light receiver 60 is provided on the other end side, so that gas emission can be detected for all batteries 20 included in battery stack 2.

When a part of the plurality of batteries 20 stacked in battery module 100 is electrically connected in parallel, there is a case where a voltage abnormality is not detected in the entire block even in a situation where a voltage abnormality occurs in one battery 20 included in the blocks connected in parallel. Even in such a situation, when the gas is ejected from battery 20 in which the voltage abnormality occurs, the ejection of the gas can be detected by light emitter 50 and light receiver 60, and the abnormal state of battery 20 can be detected.

By providing transparent window 54, light emitter 50 can prevent the gas ejected to discharge path 33 from flowing into housing 51 and adhering to light source 52. In addition, by providing transparent window 64, light receiver 60 can prevent the gas ejected to discharge path 33 from flowing into housing 61 and adhering to light receiving element 62. In addition, light emitter 50 can be reduced in size and cost by using, for example, a semiconductor laser as light source 52.

As described above, light emitter 50 is provided with emitting lens 53, and the light flux emitted from light source 52 can be adjusted to an arbitrary light flux, and light reception in light receiver 60 can be facilitated. By adjusting the light flux emitted from light source 52 to a parallel light flux as an infinite system by emitting lens 53, the intensity of light can be further increased up to the far point.

In addition, by adjusting the light flux emitted from light source 52 to a light flux having an arbitrary diffusion angle as a finite system by emitting lens 53, it is possible to stably detect the gas even when positional deviation occurs on light receiver 60 side. When battery module 100 is mounted on a vehicle, light incident on light receiver 60 may slightly move due to vibration from the vehicle. In this case, by adjusting the light flux to a light flux having a diffusion angle by emitting lens 53, it is possible to allow light receiver 60 to always receive light even for slight movement of light.

Furthermore, as described above, light receiving lens 63 is provided in light receiver 60, and the light flux incident on light receiving element 62 can be adjusted to an arbitrary light flux to correspond to the size of the light receiving area of light receiving element 62.

Discharge path 33 is defined by shielding portion 41 of cover plate 40, a pair of walls 34 surrounding the side of each opening 32, and each wall surface of base plate 31.

Since each of the wall surfaces facing discharge path 33 and defining discharge path 33 is colored in black or the like for suppressing reflection of light, it is possible to suppress light that has hit the gas from being reflected by the wall surface and reaching light receiver 60. Battery module 100 can reliably detect a decrease in light intensity at the time of gas ejection in light receiver 60 by suppressing reflection of light that has hit the gas on the wall surface.

Modified Example

Figure 7A:
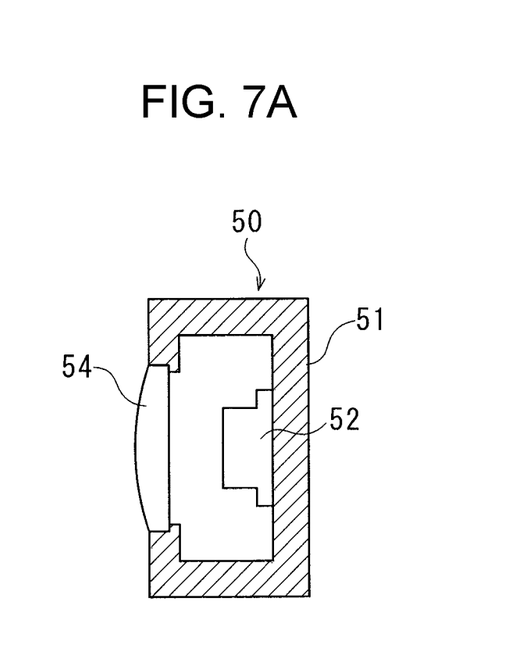
FIG. 7A is a schematic cross-sectional view illustrating a configuration of a light emitter according to a modified example.
Figure 7B:
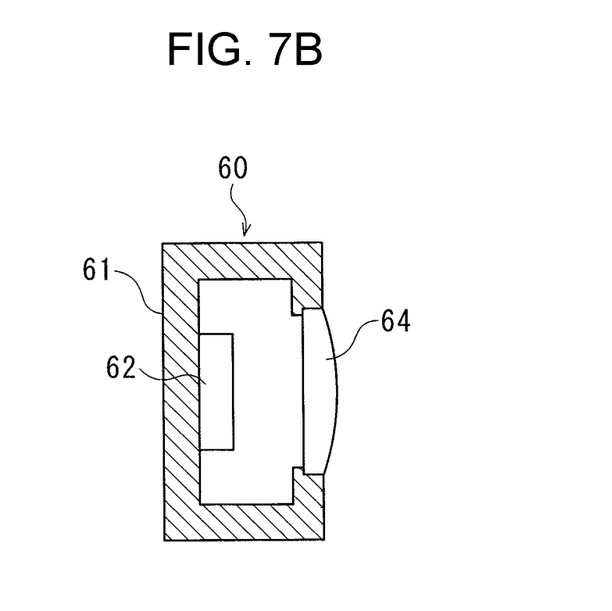
FIG. 7B is a schematic cross-sectional view illustrating a configuration of a light receiver according to a modified example.

FIG. 7A is a schematic cross-sectional view illustrating a configuration of light emitter 50 according to a modified example, and FIG. 7B is a schematic cross-sectional view illustrating a configuration of light receiver 60 according to the modified example. Light emitter 50 includes transparent window 54 having a lens shape capable of adjusting the light flux emitted from light source 52 to an arbitrary light flux. Transparent window 54 transmits the light flux emitted from light source 52 to discharge path 33, and prevents the gas emitted from battery 20 to discharge path 33 from flowing into housing 51.

In addition, the light flux emitted from light source 52 can be adjusted to an arbitrary light flux by transparent window 54. The light flux emitted from light source 52 is adjusted to a parallel light flux as an infinite system or a light flux having an arbitrary diffusion angle as a finite system. Light emitter 50 can be downsized by providing transparent window 54 with a function as a lens.

Light receiver 60 includes transparent window 64 having a lens shape capable of adjusting a light flux incident on light receiving element 62 to an arbitrary light flux. Transparent window 64 transmits the light flux from discharge path 33 into housing 61, and prevents the gas discharged from battery 20 to discharge path 33 from flowing into housing 61.

In addition, the light flux transmitted into housing 61 can be adjusted to an arbitrary light flux by transparent window 64, and for example, the light flux transmitted into housing 61 is condensed and transmitted to light receiving element 62. Light receiver 60 can be downsized by providing transparent window 64 with a function as a lens.

Figure 8:
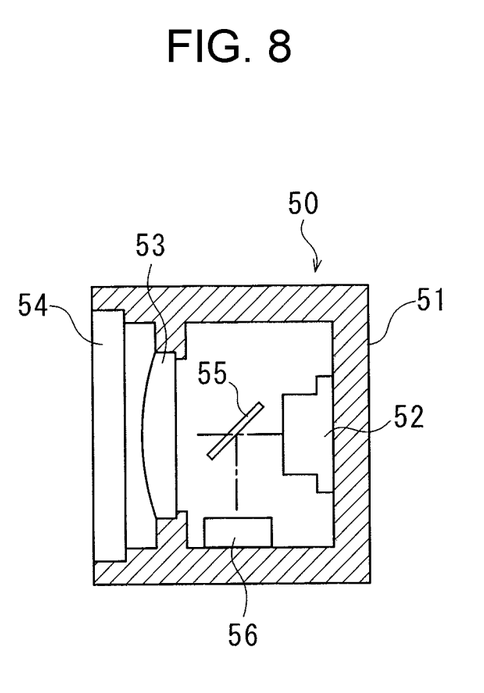
FIG. 8 is a schematic cross-sectional view illustrating a configuration of a light emitter according to another modified example.

FIG. 8 is a schematic cross-sectional view illustrating a configuration of light emitter 50 according to another modified example. Light emitter 50 includes half mirror 55 and light amount detector 56. Half mirror 55 reflects a part of the light from light source 52 to be incident on light amount detector 56. Light amount detector 56 detects a part of the light emitted from light source 52 and detects the intensity of the emitted light of light source 52. Half mirror 55 transmits light other than a part of the reflected light to the side of discharge path 33.

Half mirror 55 and light amount detector 56 are provided inside light emitter 50 which is outside discharge path 33, and can detect the intensity of the emitted light by light source 52 without being affected by the gas emitted from battery 20.

The present invention has been described based on the exemplary embodiment of the present invention. As a person skilled in the art understands, the exemplary embodiment is exemplified, and the exemplary embodiment is variously varied and modified within a scope of claims of the present invention. Further, such variations and modified examples fall within the scope of the claims of the present invention. Therefore, it should be understood that the description and the drawings herein are not limitative, but are illustrative.

The exemplary embodiment may be defined by the following items.

[Item 1]

Battery module (100) including: battery stack (2) in which a plurality of batteries (20) provided with valve (24) that ejects gas are stacked along a first direction; discharge path (33) that discharges gas ejected from valve (24) in a second direction intersecting the first direction; light emitter (50) that is provided on one end side in the first direction of battery stack (2) and emits light to discharge path (33); and light receiver (60) that is provided on another end side in the first direction of battery stack (2) and receives the light emitted from light emitter (50). Thus, battery module (100) can detect gas emitted from battery (20), and can enhance safety of battery module (100).

[Item 2]

Battery module (100) according to Item 1, in which a part of batteries (20) is electrically connected in parallel. Thus, when a voltage abnormality occurs in battery (20) included in the blocks connected in parallel and gas is ejected, battery module (100) can detect the ejection of gas and detect an abnormal state of battery (20).

[Item 3]

Battery module (100) according to Item 1 or 2, in which each of light emitter (50) and the light receiver (60) includes transparent window (54, 64) facing the discharge path. Thus, battery module (100) can prevent gas ejected to discharge path (33) from adhering to light source (52) and light receiving element (62).

[Item 4]

Battery module (100) according to any one of Items 1 to 3, in which light emitter (50) includes light source (52) and emitting lens (53) capable of adjusting a light flux emitted from light source (52) to an arbitrary light flux. Thus, battery module (100) can facilitate light reception by light receiver (60) by adjusting a light flux emitted from light source (52) to an arbitrary light flux.

[Item 5]

Battery module (100) according to Item 4, in which emitting lens (53) is capable of adjusting a finite light flux having a divergence angle. Consequently, battery module (100) can stably detect the gas even when the position of the side of light receiver (60) is shifted.

[Item 6]

Battery module (100) according to Item 4 or 5, in which light receiver (60) includes light receiving element (62) and light receiving lens (63) capable of adjusting a light flux incident on the light receiving element (62) to an arbitrary light flux. Thus, battery module (100) can adjust the light flux incident on light receiving element (62) to an arbitrary light flux, and can correspond to the size of the light receiving area of light receiving element (62).

[Item 7]

Battery module (100) according to Item 3, in which light emitter (50) includes light source (52), transparent window (54) included in light emitter (50) is capable of adjusting a light flux emitted from light source (52) to an arbitrary light flux, light receiver (60) includes light receiving element (62), and transparent window (64) included in light receiver (60) is capable of adjusting a light flux incident on the light receiving element (62) to an arbitrary light flux. Thus, in battery module (100), transparent window (54, 64) has a function as a lens, so that light emitter (50) and light receiver (60) can be downsized.

[Item 8]

Battery module (100) according to any one of Items 4 to 7, in which light source (52) is a semiconductor laser. Thus, battery module (100) can be reduced in size and cost by using a semiconductor laser as light source (52).

[Item 9]

Battery module (100) according to any one of Items 1 to 8, in which light amount detector (56) that detects a light amount of emission light from light emitter (50) is provided outside discharge path (33). Thus, battery module (100) can detect the intensity of the light emitted from light source (52) without being affected by the gas emitted from battery (20).

[Item 10]

Battery module (100) according to any one of Items 1 to 9, in which discharge path (33) is defined by a wall surface that suppresses reflection of light emitted from light emitter (50). Thus, battery module (100) can reliably detect a decrease in light intensity at the time of gas ejection in light receiver (60) by suppressing reflection of light that has hit the gas on the wall surface.

REFERENCE MARKS IN THE DRAWINGS 2 battery stacks
20 battery
24 valve
33 discharge path
50 light emitter
52 light source
53 emitting lens
54 transparent window
60 light receiver
62 light receiving element
63 light receiving lens
64 transparent window
100 battery module

The invention claimed is:

1. A battery module comprising:
a battery stack in which a plurality of batteries provided with a valve that ejects gas are stacked along a first direction;
a discharge path that discharges gas ejected from the valve in a second direction intersecting the first direction;
a light emitter that is provided on one end side in the first direction of the battery stack and emits light to the discharge path; and
a light receiver that is provided on another end side in the first direction of the battery stack and receives the light emitted from the light emitter,
wherein the light emitter includes a light source and an emitting lens configured to adjust a light flux emitted from the light source to an arbitrary light flux.

2. The battery module according to claim 1, wherein a part of the plurality of batteries is electrically connected in parallel.

3. The battery module according to claim 1, wherein each of the light emitter and the light receiver includes a transparent window facing the discharge path.

4. The battery module according to claim 1, wherein the emitting lens is configured to adjust a finite light flux including a divergence angle.

5. The battery module according to claim 1, wherein the light receiver includes a light receiving element and a light receiving lens configured to adjust a light flux incident on the light receiving element to an arbitrary light flux.

6. The battery module according to claim 3, wherein
the transparent window included in the light emitter is configured to adjust a light flux emitted from the light source to an arbitrary light flux,
the light receiver includes a light receiving element, and the transparent window included in the light receiver is configured to adjust a light flux incident on the light receiving element to an arbitrary light flux.

7. The battery module according to claim 1, wherein the light source is a semiconductor laser.

8. The battery module according to claim 1, wherein a light amount detector that detects a light amount of emission light from the light emitter is provided outside the discharge path.

9. The battery module according to claim 1, wherein the discharge path is defined by a wall surface that suppresses reflection of light emitted from the light emitter.

10. A battery module comprising:
a battery stack in which a plurality of batteries provided with a valve that ejects gas are stacked along a first direction;
a discharge path that discharges gas ejected from the valve in a second direction intersecting the first direction;
a light emitter that is provided on one end side in the first direction of the battery stack and emits light to the discharge path;
a light receiver that is provided on another end side in the first direction of the battery stack and receives the light emitted from the light emitter;
a housing including
end plates located at both ends in the first direction of the battery stack,
side plates that sandwich the end plates and cover side surfaces of the battery stack in the second direction, and
a base plate that covers one side of the battery stack in a third direction intersecting the first direction and the second direction;
a duct plate that covers an other side, opposite the one side, of the battery stack in the third direction; and
a cover plate that covers the duct plate so as to face the other side of the battery stack via the duct plate in the third direction,
wherein the discharge path is formed between the duct plate and the cover plate,
the discharge path extends in the first direction and is open at the one end side and the other end side in the first direction,
wherein the light emitter faces the discharge path and is provided on the end plate on the one end side in the first direction, and the light receiver faces the discharge path and is provided on the end plate on the another end side in the first direction.

* * * * *